United States Patent
Lachmi et al.

(10) Patent No.: US 10,796,101 B2
(45) Date of Patent: *Oct. 6, 2020

(54) OPTIMIZATIONS OF SEARCH ENGINES FOR MERGING SEARCH RESULTS

(71) Applicant: Bioz, Inc., Los Altos, CA (US)

(72) Inventors: Karin Lachmi, Palo Alto, CA (US); Daniel Levitt, Palo Alto, CA (US); Dan Grunspan, Herzeliya (IL); Ehud Pardo, Mountain View, CA (US)

(73) Assignee: Bioz, Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,218

(22) Filed: Jul. 15, 2019

(65) Prior Publication Data

US 2019/0361979 A1 Nov. 28, 2019

Related U.S. Application Data

(63) Continuation of application No. 15/600,537, filed on May 19, 2017, now Pat. No. 10,423,724.

(51) Int. Cl.

| | |
|---|---|
| *G06F 17/27* | (2006.01) |
| *G06F 40/30* | (2020.01) |
| *G06Q 30/06* | (2012.01) |
| *G06F 16/9535* | (2019.01) |
| *G06F 40/205* | (2020.01) |
| *G06F 40/242* | (2020.01) |
| *G06F 40/247* | (2020.01) |
| *G06F 40/284* | (2020.01) |
| *G06F 40/295* | (2020.01) |

(52) U.S. Cl.
CPC .......... *G06F 40/30* (2020.01); *G06F 16/9535* (2019.01); *G06F 40/205* (2020.01); *G06F 40/242* (2020.01); *G06F 40/247* (2020.01); *G06F 40/284* (2020.01); *G06F 40/295* (2020.01); *G06Q 30/0633* (2013.01)

(58) Field of Classification Search
None
See application file for complete search history.

(56) References Cited

U.S. PATENT DOCUMENTS

| | | | |
|---|---|---|---|
| 8,630,846 B2 | 1/2014 | Ehsani et al. | |
| 8,650,026 B2 | 2/2014 | Ehsani et al. | |
| 10,423,724 B2* | 9/2019 | Lachmi | G06F 40/295 |
| 2009/0119283 A1* | 5/2009 | Muehlbauer | G06F 16/951 |

(Continued)

*Primary Examiner* — Satwant K Singh
(74) *Attorney, Agent, or Firm* — Perkins Coie LLP

(57) ABSTRACT

Disclosed herein are methods, systems, and apparatuses, including computer programs encoded on computer storage media, for computing numeric representations of words. One of the methods includes obtaining, from a corpus of journals, a plurality of objects. The corpus is analyzed for contextual clues as to the nature of each of these objects. Contextual analysis may include an analysis of particular fields of metadata to do with the objects. Another example of contextual analysis involves identification of an experiment that a group of objects are commonly associated with and merging objects therefrom. A third contextual analysis example makes use of word vectors about each object. Using these contextual analyses, objects are merged together with the context of search results of a search engine.

20 Claims, 9 Drawing Sheets

(56) References Cited

U.S. PATENT DOCUMENTS

| | | | |
|---|---|---|---|
| 2010/0131563 A1* | 5/2010 | Yin | G06F 16/355 |
| | | | 707/794 |
| 2013/0152000 A1 | 6/2013 | Liu et al. | |
| 2013/0173255 A1 | 7/2013 | Ehsani et al. | |
| 2014/0136189 A1 | 5/2014 | Ehsani et al. | |
| 2014/0188830 A1 | 7/2014 | Deville et al. | |
| 2017/0322930 A1 | 11/2017 | Drew | |
| 2018/0285744 A1* | 10/2018 | Kang | G06K 9/4628 |
| 2019/0205773 A1* | 7/2019 | Ackerman | G06F 16/212 |

* cited by examiner

| Experiment A | |
|---|---|
| Object: | Frequency: |
| 1 | 7,082 |
| 2 | 6,746 |
| 3 | 6,621 |
| 4 | 6,167 |
| 5 | 5,931 |
| 6 | 700 |
| 7 | 2 |

Research Journal A — Abstract Identifies Experiment A

*FIG. 7*

OPTIMIZATIONS OF SEARCH ENGINES FOR MERGING SEARCH RESULTS

CROSS-REFERENCE TO RELATED APPLICATIONS

This application is a continuation of U.S. patent application Ser. No. 15/600,537, filed May 19, 2017, now U.S. Pat. No. 10,423,724, issued Sep. 24, 2019, which is incorporated by reference herein in its entirety.

TECHNICAL FIELD

This specification relates to computing numeric representations of words. In order to predict one or more unknown words in a sequence of words, e.g., in a sentence or a phrase, some systems convert one or more of the words in the sequence into numeric representations.

BACKGROUND

Internet search engines generally parse large quantities of data for inputted queries. Different authors often generate the data, each having varying nomenclature for the subject content. In many search engines, it is valuable to present all relevant hits, or results, of a given search. However, in some circumstances, returning a result for the same item, identified a number of ways, multiple times, is not useful. There needs to be a way to merge search results.

BRIEF DESCRIPTION OF THE DRAWINGS

FIG. 7 is an illustration of an examination of an experiment list compared to a research journal article.

DETAILED DESCRIPTION

Figure 1:
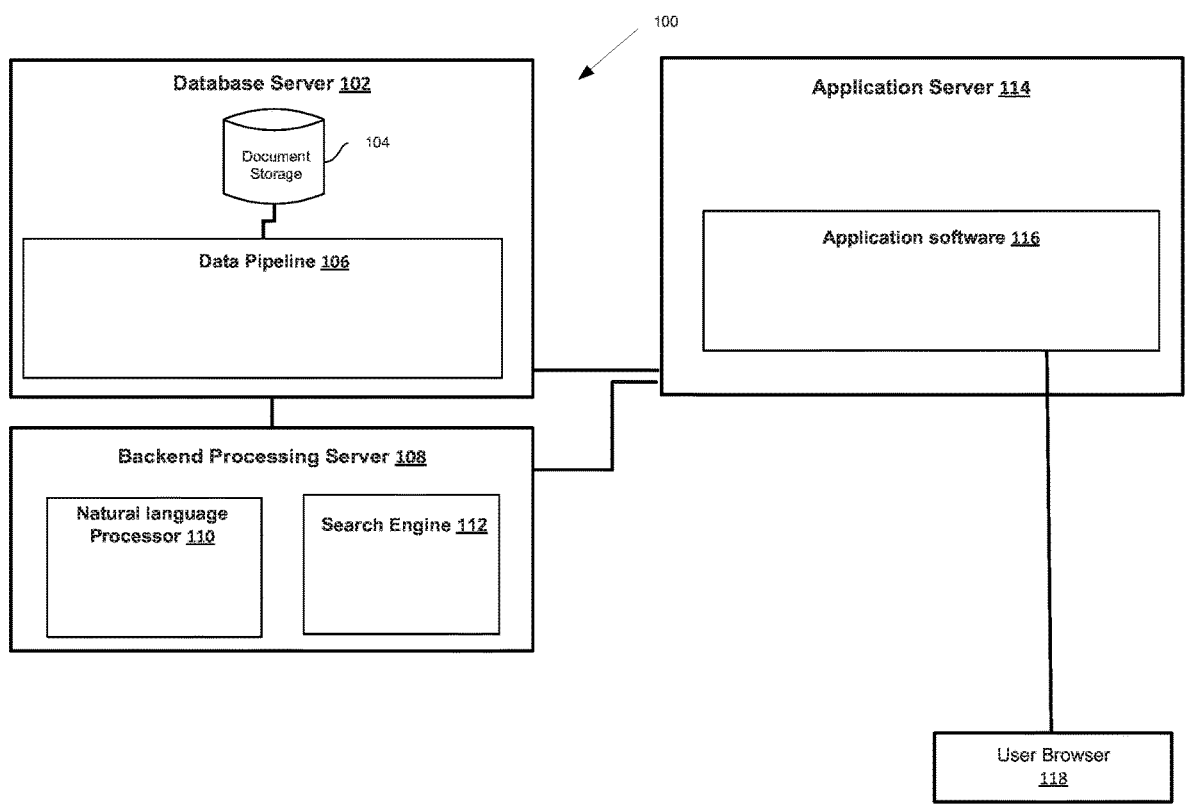
FIG. 1 is a block diagram illustrating an overview of a database server and an evaluation module communicating with servers that display information to a user browser.

Disclosed herein is a search engine optimization. Specifically, the optimization is used to identify matching items that may be described a number of different ways, such that these items can be merged together in search results and presented as a single result within a list of purchasable objects. The optimization functions particularly within a search engine designed to search a large corpus of text documents, such as scientific research journals.

In a particular application, a given search engine is based on a corpus of scientific research journals and is specifically parsed for items that researchers use in their experiments. Based on a number of factors, including frequency of appearance in journals, the items used in the experiments, or scientific tools, are rated. The accuracy of the system is therefore tied to being able to identify that a given scientific tool, identified in multiple ways (e.g., by manufacturer, or by distributor), is read by a natural language processor as the same scientific tool.

Merging the scientific tools (objects) in the search engine improves the overall accuracy of rating algorithms and improves the user interface for presenting search results. Where the search engine presents purchase links for the scientific tools, it is bothersome to a user to have multiple links to purchase the same scientific tool.

One innovative aspect of the subject matter described in this specification can be embodied in a method for merging objects extracted from the text of research journals, using differing nomenclature, into uniform object categories for concise searchability. There are a number of steps. First, a natural language processor extracts a plurality of objects from a corpus of text research journals. Each object of the plurality of objects is a term within a journal of the corpus of text research journals that contextually identifies a usable item. Next, the processor attaches context data to each object of the plurality of objects. The context data may include descriptive terms associated with the object, word vectors in relation to appearances of the object, and experiments the object is described as being used in, all found within the corpus of text research journals. Finally, a search engine merges at least two of the objects of the plurality of objects included in a set of search results into a single search result based on the first object and the second object having matching context data.

In the following description, for the purposes of explanation, numerous specific details are set forth in order to provide a thorough understanding of the embodiments of the invention. One skilled in the art will recognize that the embodiments of the invention may be practiced without these specific details or with an equivalent arrangement. In other instances, well-known structures and devices are shown in block diagram form in order to avoid unnecessarily obscuring the embodiments of the invention.

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. For example, two devices may be coupled directly or via one or more intermediary channels or devices. As another example, devices may be coupled in such a way that information can be passed there between while not sharing any physical connection with one another.

The words "associate with," meanwhile, mean connecting or relating objects, items, etc. For example, a piece of metadata may be associated with a particular legal entity.

Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The terms "module" and "engine" refer broadly to software, hardware, or firmware components (or any combination thereof). Modules and engines are typically functional components that can generate useful data or another output using specified input(s). A module may or may not be self-contained. An application program (also called an "application") may include one or more modules, or a module may include one or more application programs.

A computer or a plurality of computers may be, for example, personal computers, mobile phones, PDAs, tablets (e.g., iPad®), or wearable devices (e.g., watches).

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example, using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, and special significance is not to be placed upon whether or not a term is elaborated on or discussed herein. Synonyms for certain terms are provided. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to the various embodiments given in this specification.

FIG. 1 is a block diagram illustrating a system 100. The system 100 includes a database server 102. The database server includes document storage 104 and a data pipeline 106. Document storage 104 is a database storing a large quantity of documents, or "a corpus." An example of a corpus of documents is a collection of published researched journals ranging from a wide array of scientific topics. Another example is a collection of user reviews of a wide array of given products, services, and/or commercial establishments. Communicating with document storage 104 is a data pipeline 106 for communicating the contents of documents to a backend processing server 108 and back again.

The backend processing server 108 includes a natural language processor 110. The natural language processor 110 ("NLP") parses through documents stored in document storage 104 and determines contextual data about words, sentences, and paragraphs therein. The results of the NLP procedure are organized and used by a search engine 112 to generate results from user searches.

The backend server 108 communicates to a front-end server, application server 114. The application server 114 includes application software 116 and interfaces with a user browser 118. The application software 116 handles user requests and forwards to the search engine 112 in order to return results. The configuration of the individual servers and modules is not limited to a single machine or several machines. Implementations adjust as suitable for circumstances or ordinary considerations in the art.

Figure 2:
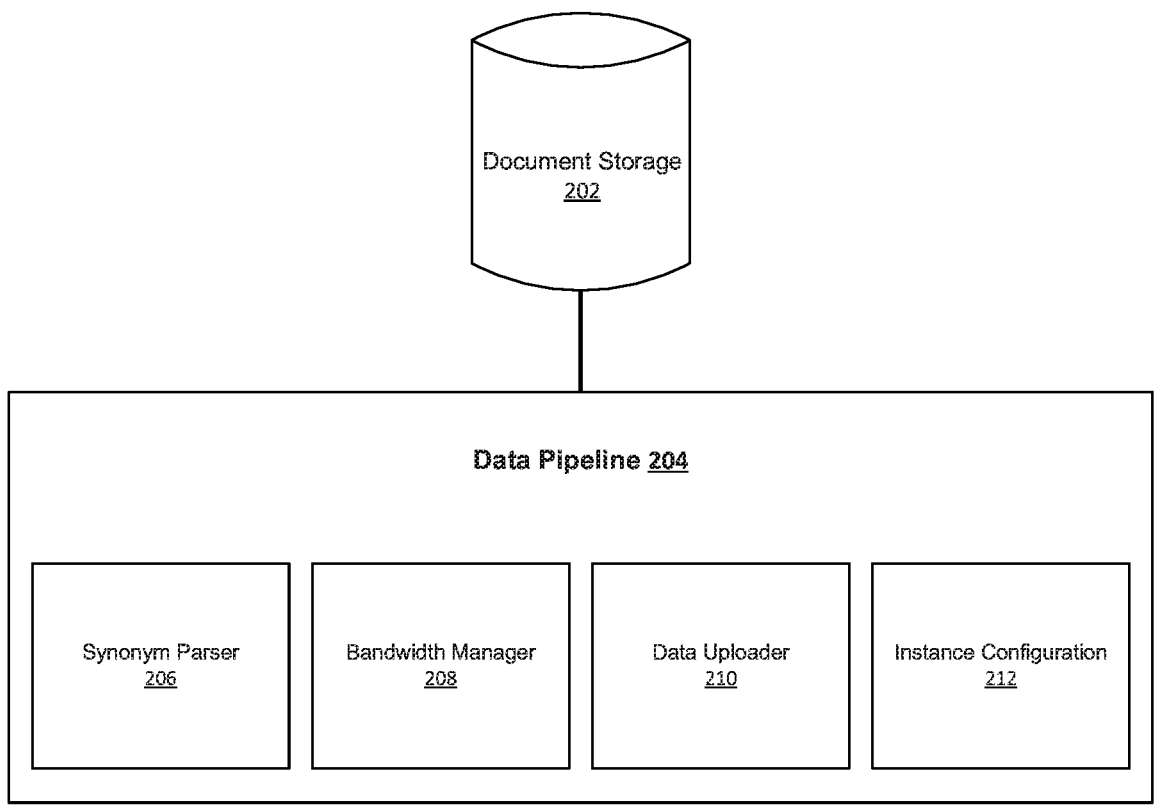
FIG. 2 is a block diagram illustrating a database server consisting of document storage that feeds into a data pipeline.

FIG. 2 is a block diagram illustrating a database server 200 consisting of document storage 202 that feeds into a data pipeline 204. An embodiment of this method receives a corpus of input data to document storage 202. This corpus of input data includes published research journals, patents, grants, published sales data, internally recorded analytical sales data, and published descriptions of scientific experiments. The corpus of input data is mined/parsed for objects used and referenced within. Objects in this case may be a number of things. In some embodiments, these objects are commercial products, services, or locations. A more specific example of such an object is a science tool.

Science tools include laboratory equipment used for taking measurements (e.g., thermometers, graduated cylinders, scales, or spectrometers), equipment for conducting experiments (e.g., Bunsen burners, petri dishes, or microscopes), consumables (e.g., antibodies, assays, or reagents), and resources. These descriptions of scientific experiments and science tools are used in generating the results for said research journals.

Within a data pipeline 204, a synonym parser 206 is responsible for converting all of the different forms of synonym representations to a standard format compatible with the back-end server. Synonym representations may include MeSH (Medical Subject Headings), manually added synonyms, supplements, and company lists. One embodiment takes in one term and converts it into another field that represents all terms that are equivalent to it. This enables the search query to find data on a term, or all of its synonyms, in an efficient way without having to search for all of the synonyms of a term.

A bandwidth manager 208 optimizes the use of the available bandwidth. An embodiment of the bandwidth manager assesses the performance of the system in terms of data input and output rates, content conversion rates, and computation times. Such embodiments will reallocate resources to improve the overall performance of a system.

A data uploader 210 and an instance configuration 212 module exist in the data pipeline to communicate data from the database server 200 to other modules, such as the NLP module of the backend server. The instance configuration 212 module instantiates an object or data, usually categorizing its value, e.g., type or class.

Then, the objects are recorded into a database along with the research journals. Each object is passed into the database with the research document from which it originated.

Figure 3:
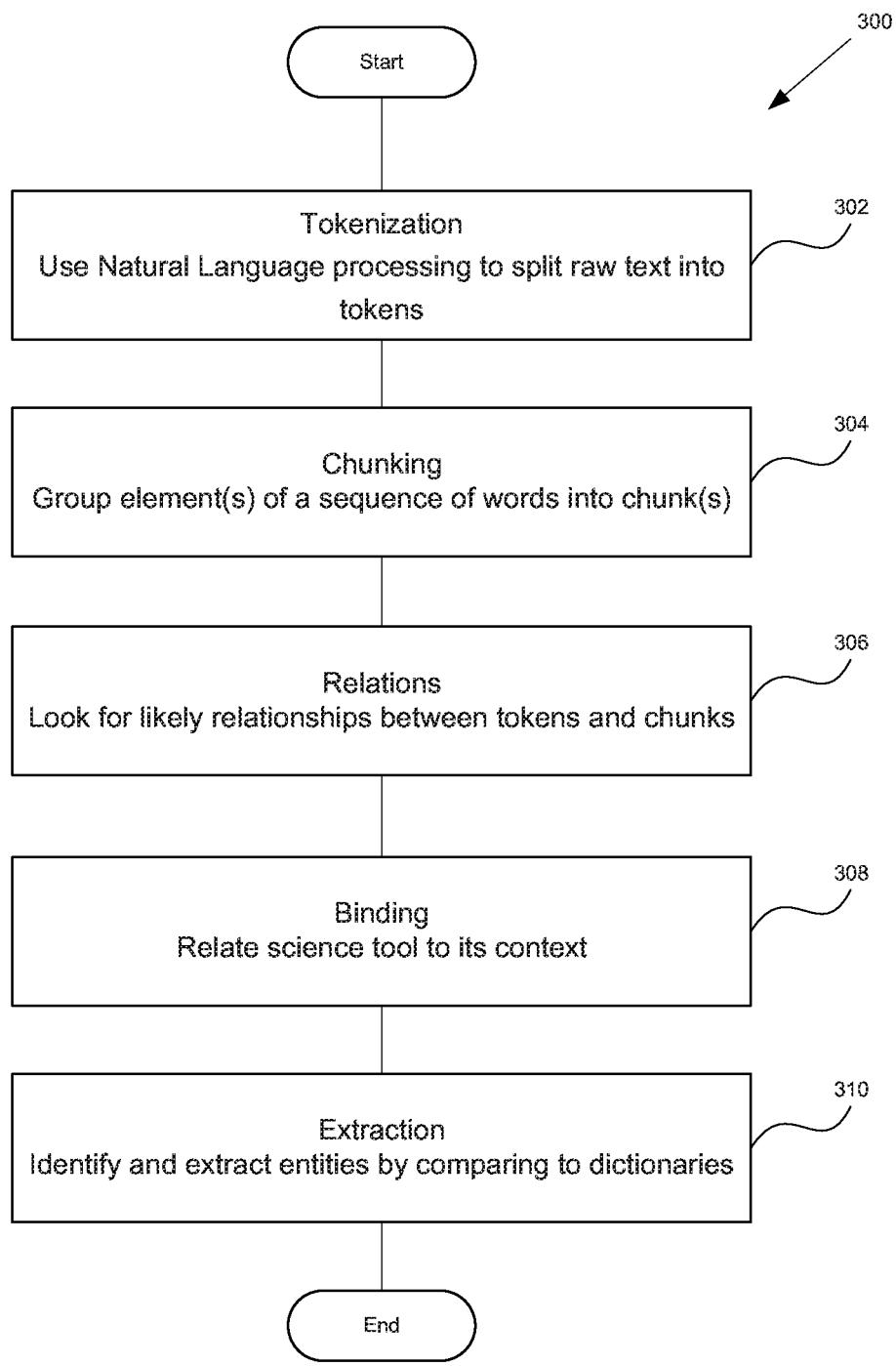
FIG. 3 is a flowchart diagram of an evaluation module consisting of semantic processing engines.

FIG. 3 is a block diagram of an NLP module 300 consisting of the following semantic processing submodules: tokenization 302, chunking 304, relations 306, binding 308, and extraction 310. Note that a journal processing parser can be contained in the NLP module and operates in the same fashion as the other submodules described herein.

First, a plurality of data is collected that pertains to objects by parsing through a corpus of published source data in a journal parser module. The source data is comprised of a corpus of documents. Examples of the documents include any of research journals, research grants and grant proposals, scientific dissertations, patent documents, or consumer reviews. A NLP is used to populate a number of properties for the particular object. NLP is an area of research and application that combines computer science, artificial intelligence, and computational linguistics to understand and manipulate natural language, text or speech. A tokenizer module 302 then uses NLP to break a stream of text into words, phrases, symbols or other meaningful elements called tokens.

Next, a chunking module 304 groups elements of a sequence of words into one chunk, without any overlap between obtained groups. Verbs and nouns are identified, and their exact offset is marked in the sentence. A domain specific custom chunker is used to tie multiple words into one phrase. Chunkers can identify parts of sentences (e.g., nouns, verbs, adjectives) to determine specific relationships between the words grouped into a chunk. Such examples of a chunking module are noun phrase chunking (NP-chunking) or verb group chunking.

A relations module 306 looks for likely relationships between different entities in the text. A binding module 308 relates each science tool to its context. The module will consider several binding rules. One such rule can bind a product that a company produced to that company. Another rule can bind an assay to its assay name.

A semantic extraction module 310 identifies and extracts entities, facts, attributes, concepts and events. This module enables the analysis of unstructured content via NLP and Named-Entity Recognition (NER). The module contains a knowledge graph and is a superset of dictionaries. Dictionaries are used to identify various types of entities/objects. The set of dictionaries is a combination of collected and edited dictionaries, catalogs from vendors, and public dictionaries in the biology research community such as the MeSH (PubMed) and Gene (NCBI) databases.

A knowledge graph consists of additional sophisticated relationships that are needed to identify entities that are not in the set of dictionaries. Knowledge Graphs, such as the Knowledge Graph used and marketed by Google, Inc., collect information about objects in the real world and connect that information to related topics. By understanding the relationships between objects, the Knowledge Graph better understands what exactly the user is searching for. The techniques disclosed herein use both dictionaries and a knowledge graph to provide better search results.

After concluding the extraction steps in 310, the properties collected include any of source, conditions, catalog number, dilution, location, temperature, and assay.

Figure 4:
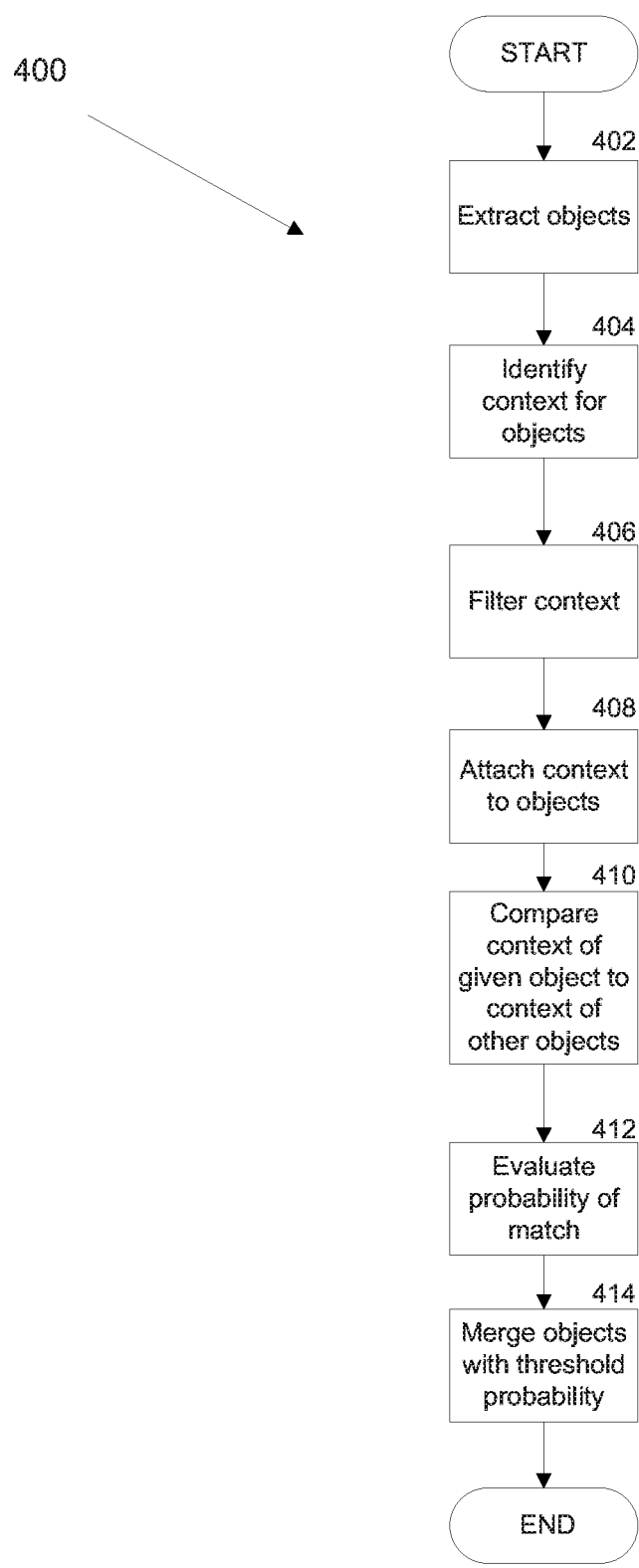
FIG. 4 is a flowchart diagram of attaching contextual data to extracted objects.

FIG. 4 is a flowchart diagram of attaching contextual data to extracted objects. The flowchart largely encompasses the binding step of FIG. 3, though it includes a number of other overlapping steps. In step 402, objects are extracted from a corpus. In some embodiments, the objects are science tools from a corpus of research journals. Step 402 is the primary focus of FIG. 3. More details on that process are discussed above.

In step 404, the NLP identifies contextual data for each object. When a product (object) is mentioned in a research journal, there is context that accompanies the product name. The context provides details on the specific product used in this specific instance. The context includes a number of facts such as name of manufacturer, name of distributor, catalog number, state of matter, specific products, related family, use conditions, and other suitable facts known in the art. In some embodiments, context includes the string value (name) of the object. Where the string value is multiple words, or the words are of a distinguishable length (e.g., particularly long, particularly short, or over/under a particular length) this may also be used as contextual data. In step 406, The NLP filters the context and breaks down the data into specific phrases that do not contain noise words. Noise words are common words that carry little contextual meaning. These words are filtered out via the use of dictionaries.

In step 408, the NLP attaches/binds this structural context with the object (product in this instance). The attached context is stored as metadata of the object. In some embodiments, the context is stored with respect to particular fields of metadata. The fields match particular categories of potential context. In these embodiments, step 404 is performed in reference to filling these metadata fields. For example, one field may be the manufacturer of the object. In the search for context, the NLP is particular in searching to supply a value to this field. This may be aided through the use of dictionaries.

In step 410, the search engine compares the context data of objects against one another. In some embodiments, this step may be further optimized so that clear examples of differing objects are not compared. For example, a chemical would not be compared to a microscope. These types of objects are generally easy to tell apart by name alone, and variety in nomenclature would not lead to a significant error rate. Given the large quantities of data compared, reducing the computational expense is useful. When the context data of multiple objects is compared, the output is a probability of match.

Machine learning applications operate on a principle likelihood of correctness—this application is no different. The context of the two objects is checked for equality. If the two objects share some of the context, or if one context is equal the other object, that increases the probability of the two objects meaning the same thing. Some types of context data contribute to the probability of match more so than others. Where a given manufacturer is included in the contextual data of multiple objects, and system data indicates that the given manufacturer only produces a single product, it is highly likely that each of the referenced objects refers to the same product. The same is true for a likelihood of not matching. If one object is identified as having a solid state of matter, it is unlikely (with notable exceptions) that another object having a gaseous state refers to the same product. Thus, the state of matter can significantly affect a match probability.

In step 412, the search engine evaluates the probability of match between two objects. This evaluation is considered with respect to one or more thresholds. The probability of match may have more than one attribute (relating to different types of contextual data). Each attribute may be evaluated with respect to a unique threshold. In step 414, where the thresholds are met, the objects are merged. The merging of objects affects both the count of the number of appearances of the object in the corpus and the appearance of search results containing the object.

Figure 5:
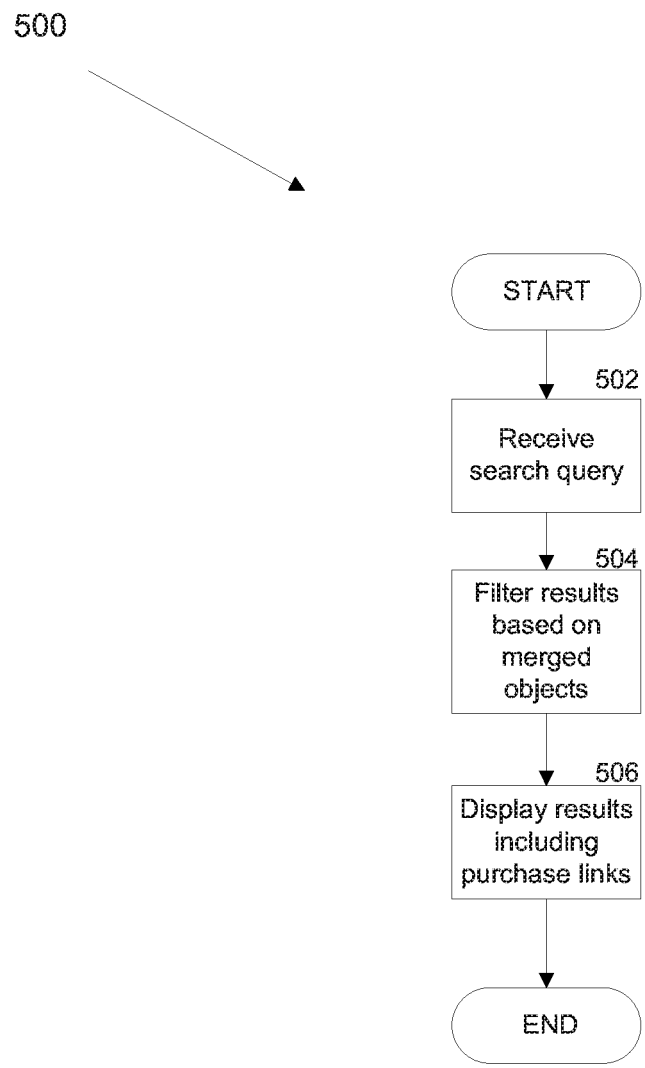
FIG. 5 is a flowchart diagram of displaying merged search results.

FIG. 5 is a flowchart diagram displaying merged search results. In step 502, the search engine receives a search query from a user. The search query is for a given type of object, such as a science tool. Queries may also be more specific as to identify a particular object or science tool (as opposed to a class or type). In step 504, the search queries are compared to indexed results within the search engine as extracted from the corpus. While particular instances of objects may still be included within search engine indexes, only a single a search result will be included for any number of discrete objects having a matching meaning (as determined by the object merging of FIG. 4).

In step 506, the search engine returns results to the user. In some embodiments, the results include a purchase link for the object. The purchase link is influenced by contextual data as determined in FIG. 4. The search engine uses contextual data, such as the name of the distributor of the science tool (object), to provide a link to purchase the science tool via the search results. Where a given object matches another object despite having differing distributors, the purchase link associated with the single search result may be reconciled to a distributor having the lowest cost for the object, or to a distributor bound to the greatest number of instances of the object.

Figure 6:
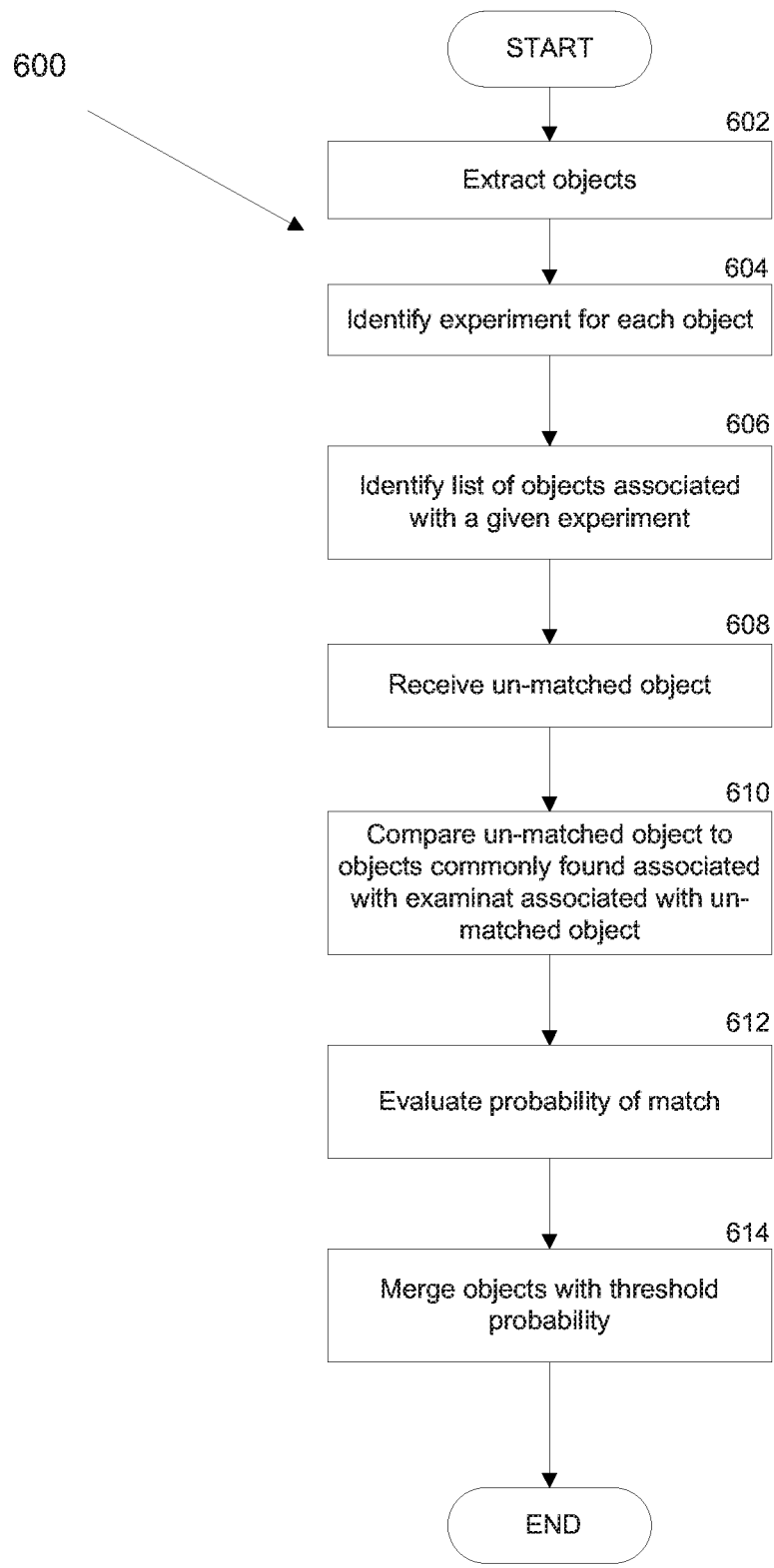
FIG. 6 is a flowchart diagram of experiment matching.

FIG. 6 is a flowchart diagram of experiment matching. In step 602, objects are extracted from a corpus. In some embodiments, the objects are science tools from a corpus of research journals. Step 602 is the primary focus of FIG. 3. More details on that process are discussed above. In step 604, for each object, the NLP identifies an experiment the object is associated with. The experiment may be the focus of a given research journal article. Alternatively, the experiment may be a step within a greater goal of the given research journal article. In some embodiments, each object has multiple experiments associated therewith.

In order to identify the experiment(s) associated with a given object, the NLP identifies an abstract section of the research journal. In many cases, the given experiment may be described a number of different ways, and thus the experiment is classified via NLP and machine learning. In this manner, the experiment may be given an arbitrary identification that is shared with similar experiments. Similarity between experiments is determined via contextual comparisons and matching subjects and verbs in the experiment description. An additional manner to determine a given experiment to which an object is associated is to examine contextual data (as in FIG. 4). Experiments identified in this manner may also have arbitrary identifiers.

In step 606, for each experiment, the NLP identifies a list of associated objects. This list is a form of knowledge graph that includes a number of objects and their frequency of use in that experiment across the entire corpus. Each of the objects included on the list associated with the given experiment are different and un-merged with one another. This list signifies objects that are often used in experiments together. The list of objects associated with an experiment further includes the frequency a given object is associated with a given experiment. An object referenced as being used thousands of times within a given experiment has a strong association with the given experiment. Conversely, an object referenced to be used in a given experiment once has a weak association with the given experiment.

In step 608, the search engine receives an un-matched or un-merged object in the process of indexing. This step may be performed contemporaneously and in parallel with the method described in FIG. 4. In step 610, the search engine examines the un-matched object with reference to experiments to which the un-matched object is associated. In this examination step, objects found with the same document as the un-matched object are compared to the list of objects associated with the experiment. The search engine attempts to match objects contained in the document with objects associated with the experiment. Components of an experiment are often repeated, thus, where some of the components are found, it is likely other common components are found. Step 610 is described in further detail using an illustrative example in FIG. 7.

FIG. 7 is an illustration of an examination of an experiment list compared to a research journal article. The figure depicts data sources in step 610 of FIG. 6. For example, the NLP has identified and arbitrarily titled a given experiment as "Experiment A." In previous analysis, the search engine and NLP have identified seven objects (defined here as numbers 1-7) as being associated with Experiment A. Each of the objects has a frequency for which the respective object was referenced with Experiment A. Objects 1-5 are all strongly associated with Experiment A based on their respective frequencies. Object 6 is moderately associated with Experiment A, and object 7 is weakly associated with Experiment A.

Upon analyzing Research Journal A, the NLP determines via the abstract that all objects within Journal A are associated with Experiment A. Based on other analysis (e.g., contextual), the NLP and the search engine have determined that objects 1, 2, 4, 5 and 6 are found in Journal A. An additional object, k, remains un-matched.

Because object $\lambda$ is associated with Experiment A, object $\lambda$ is compared to the experiment list. There are two objects on the experiment list that are associated with Experiment A that are still unaccounted for in Journal A. Therefore, there is a likelihood that object $\lambda$ is either object 3 or object 7. The likelihood that object $\lambda$ is object 3 is significantly higher than the likelihood that object $\lambda$ is object 7, based upon the respective frequency of each. Despite this, there is still a likelihood that object $\lambda$ is neither object 3 or object 7. The probabilities of matching are used as a factor in determining whether to merge a given object, such as k, with another object.

This example is provided with reference to merging a single object. However, in practice, more than one object may be un-merged when initially analyzed. In some embodiments, all objects within a given research journal may be un-merged. Thus, the system attempts to match each of the un-merged objects to objects on the associated experiment list. This is performed using other merging methods disclosed herein (e.g., direct equality matching, contextual comparison), or otherwise known in the art.

Returning to FIG. 6, the flowchart diagram of experiment matching, in step 612, the search engine evaluates the probability of match between two objects (one on an experiment list knowledge graph and the other within a research journal). This evaluation is considered with respect to one or more thresholds. The probability of match may have more than one attribute. Each attribute may be evaluated with respect to a unique threshold. In step 614, where the thresholds are met, the objects are merged. The merging of objects affects the count of the number of appearances of the object in the corpus, the frequency the object is referenced in that experiment, and the appearance of search results containing the object.

Figure 8:
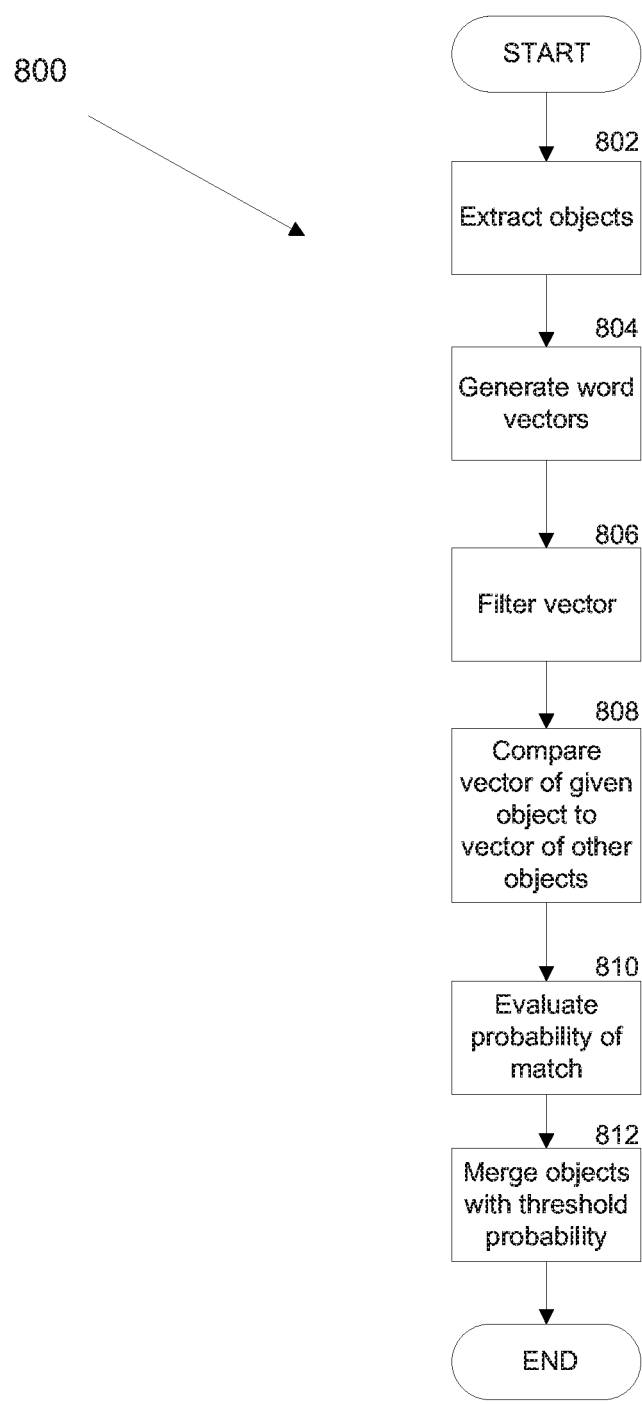
FIG. 8 is a flowchart diagram of word vectors used to merge objects.

FIG. 8 is a flowchart diagram of word vectors used to merge objects. Word vectors, such as those generated with the Word2Vec algorithm, differ from contextual analysis in that contextual analysis looks to fill specific metadata fields for a given object, whereas a word vector is interested only in the words within N words of a given word. For example N, may be two words.

In step 802, objects are extracted as discussed with reference to methods in other figures. In step 804, the NLP generates word vectors left and right of each object. The vectors are of a predetermined length. Optionally, in step 806, noise words are filtered out of each vector such that some vectors extend further than the predetermined length of words by virtue that some words are discarded. Noise words are determined via the use of dictionaries.

In step 808, the search engine compares the vector data of objects against one another. In some embodiments, this step may be further optimized so that clear examples of differing objects are not compared. For example, a chemical would not be compared to a microscope. These types of objects are generally easy to tell apart by name alone, and variety in nomenclature would not lead to a significant error rate. Given the large quantities of data compared, reducing the computational expense is useful. When the vector data of multiple objects is compared, the output is a probability of match. Vectors of the two objects are checked for equality. If the two objects share some of the same words within a vector, or if one vector is equal to the other object, the probability the two objects mean the same thing increases.

In step 810, the search engine evaluates the probability of match between two objects. This evaluation is considered with respect to one or more thresholds. The probability of match may have more than one attribute. Each attribute may be evaluated with respect to a unique threshold. In step 812, where the thresholds are met, the objects are merged. The merging of objects affects the count of the number of appearances of the object in the corpus and the appearance of search results containing the object.

Each of the techniques disclosed herein is cumulative. Finding a high match rate for a given technique is combined with the respective rates on other techniques to determine an overall likelihood of match. Whether the system merges/matches a given object with another depends on the result of a sum of all the techniques disclosed herein, in addition to other known techniques.

An Example Machine Overview

The machine-implemented operations described above can be implemented at least partially by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the embodiments introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Figure 9:
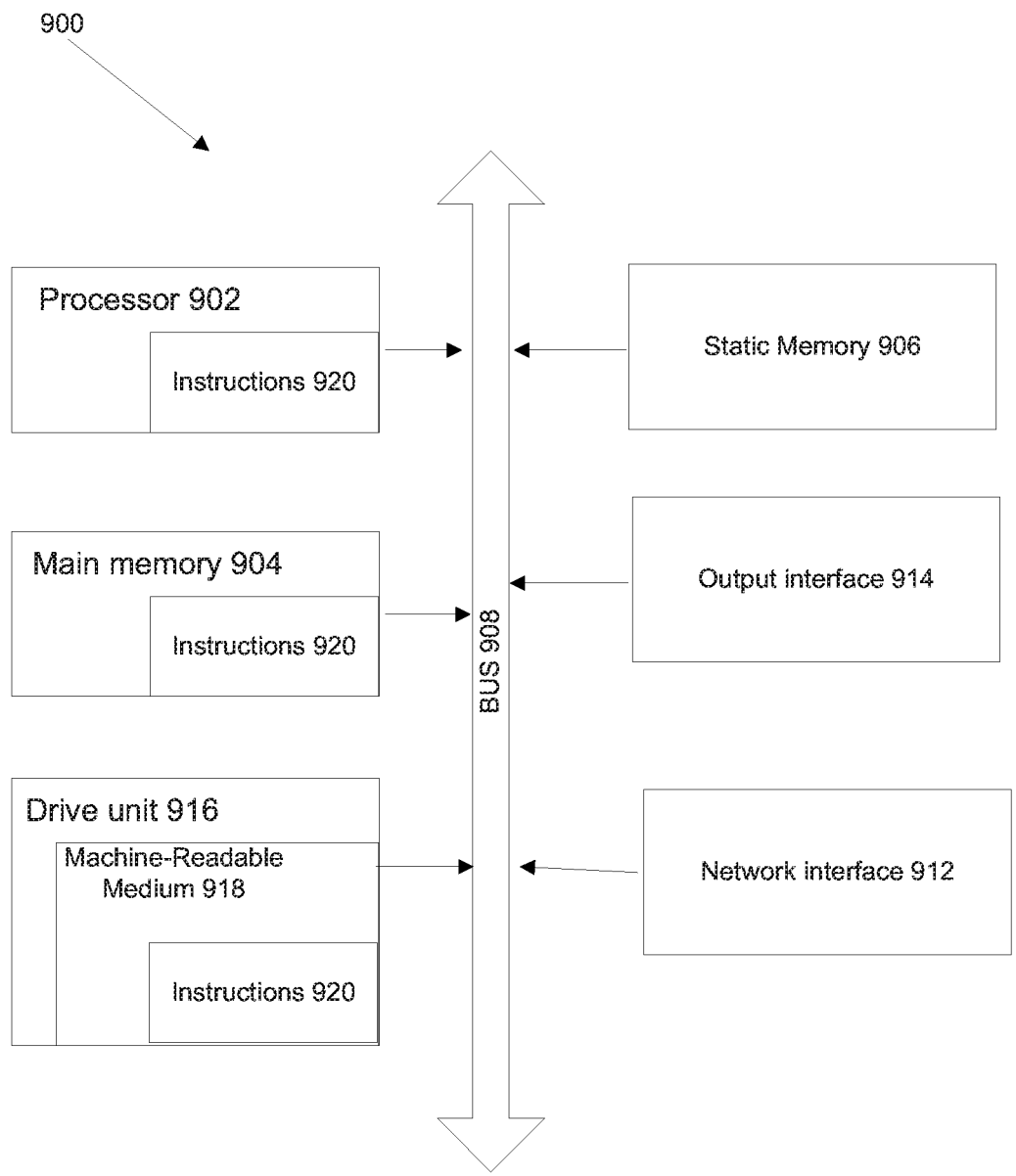
FIG. 9 is a block diagram of an exemplary computer system.

FIG. 9 is a block schematic diagram of a system in the exemplary form of a computer system 900 within which a set of instructions for causing the system to perform any one of the foregoing methodologies and logical flows may be executed.

The computer system 900 includes a processor 902, a main memory 904 and a static memory 906, which communicate with each other via a bus 908. The computer system 900 further includes a network interface 912. The computer system 900 also includes an output interface 914, for example, a USB interface, a network interface, or electrical signal connections and/or contacts;

The disk drive unit 916 includes a machine-readable medium 918 on which is stored a set of executable instructions, i.e., software 920, embodying any one, or all, of the methodologies described herein. The software 920 is also shown to reside, completely or at least partially, within the main memory 904 and/or within the processor 902. The software 920 may further be transmitted or received over a network by means of a network interface device 914.

In contrast to the system 900 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g., a computer.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine or computer-readable media used to actually affect the distribution.

Although the above Detailed Description describes certain embodiments and the best mode contemplated, no matter how detailed the above appears in text, the embodiments can be practiced in many ways. Details of the systems and methods may vary considerably in their implementation details while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which are set forth in the following claims.

The invention claimed is:

1. A method comprising:
    extracting, by a natural language processor, a plurality of objects from a corpus of text, each object of the plurality of objects is a term within a document of the corpus of text that contextually identifies a usable item;
    attaching context data to a first object and a second object of the plurality of objects, the context data including a source associated with each respective object and found within the corpus of text;
    integrating the first object and the second object as separate searchable results within a search engine; and
    merging the first object and the second object into a single searchable result based on the first object and the second object having corresponding context data.

2. The method of claim 1, wherein the source includes any of:
    name of a company associated with the object; or
    catalog number of the object.

3. The method of claim 1, wherein said merging is further comprising:
    identifying, for each object, an experiment found within the corpus of text that each respective object is associated with; and
    said merging further based on the first object and the second object having a same experiment associated therewith.

4. The method of claim 1, said merging further comprising:
    determining a certainty percentage for the first object and the second object having corresponding context data; and
    merging the first object and the second object in response to the certainty percentage being over a predetermined threshold.

5. The method of claim 4, said attaching further comprising:
    inputting values into particular type specific fields, the values based on the contextual data; and
    said merging wherein has a given type specific field has greater influence on the certainty percentage than another type specific field.

6. The method of claim 1, further comprising:
    displaying, by the search engine, a purchase link for the single searchable result, the purchase link directing users to a website that receives orders for the single searchable result.

7. The method of claim 1, wherein the documents of the corpus of text are research journals.

8. The method of claim 1, wherein the context data further includes any of:
    state of matter of the object;
    conditions upon which the object is used; or
    additional objects used with the object.

9. A method comprising:
    extracting, by a natural language processor, a plurality of objects from a corpus of text, each object of the plurality of objects is a term within a document of the corpus of text that contextually identifies a usable item;
    respectively generating a first word vector and a second word vector for a first object and a second object of the plurality of objects, the first word vector and second word vector based on words neighboring each respective object in the corpus of text;
    integrating the first object and the second object as separate searchable results within a search engine; and
    merging the first object and the second object into a single searchable result based on exceeding a predefined threshold of similarity between the first word vector and second word vector.

10. The method of claim 9, further comprising:
    discarding a predefined set of noise words from the corpus of text.

11. The method of claim 9, further comprising:
    identifying, for the first object and the second object, an experiment found within the corpus of text research journals that each respective object is associated with; and
    said merging further based on the first object and second object having a same experiment associated therewith.

12. The method of claim 9, further comprising:
    attaching context data to each object of the plurality of objects, the context data including source data associated with each respective object and found within the corpus of text research journals; and
    said merging the first object and second object further based on the first object and the second object having matching context data.

13. The method of claim 9, further comprising:
    incrementing, by the search engine, an overall count of references of the single searchable result in the corpus of text based a number of objects merged.

14. The method of claim 9, further comprising:
displaying, by the search engine, a purchase link the single searchable result, the purchase link directing users to a website that receives orders for the single searchable result.

15. A system comprising:
a natural language processor configured to extract a plurality of objects from a corpus of text, each object of the plurality of objects is a term within a document of the corpus of text that contextually identifies a usable item, the natural language processor further configured to attach context data to a first object and a second object of the plurality of objects, the context data including a source associated with each respective object and found within the corpus of text; and
a search engine configured to integrate the first object and the second object as separate searchable results and subsequently merge the first object and the second object into a single searchable result based on the first object and the second object having corresponding context data.

16. The system of claim 15, wherein the context data is any of:
name of a company associated with the object;
state of matter of the object;
catalog number of the object;
conditions upon which the object is used; or
additional objects used with the object.

17. The system of claim 15, wherein the search engine is further configured to identify, for each object, an experiment found within the corpus of text that each respective object is associated with and further base the merging of the first object and second object on the first object and the second object having a same experiment associated therewith.

18. The method of claim 15, wherein the search engine is further configured to generate, for each object, a word vector within the corpus of text based on words neighboring each respective object in the corpus of text including a source associated with each respective object and found within the corpus of text and further basing the merging of the first object and second object on the first object and the second object exceeding a predefined threshold similarity between respective word vectors.

19. The method of claim 15, wherein the search engine is further configured to determine a certainty percentage for the first object and the second object having matching context data; and
to further base the merging of the first object and the second object on the certainty percentage being over a predetermined threshold.

20. The system of claim 15, wherein the search engine is further configured to increment an overall count of references of the single searchable result in the corpus of text for both the first object and the second object.

* * * * *